(12) United States Patent
Salber et al.

(10) Patent No.: US 6,334,417 B1
(45) Date of Patent: Jan. 1, 2002

(54) METHOD OF COLD STARTING A THROTTLE-FREE, MULTI-CYLINDER INTERNAL-COMBUSTION ENGINE

(75) Inventors: Wolfgang Salber; Martin Pischinger; Thomas Esch; Jürgen Hagen, all of Aachen (DE)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 09/351,333

(22) Filed: Jul. 12, 1999

(30) Foreign Application Priority Data

Jul. 10, 1998 (DE) .......................... 198 30 974

(51) Int. Cl.$^7$ .......................... F02D 43/00; F02N 17/08
(52) U.S. Cl. .............................. 123/179.1; 123/179.5; 123/179.18
(58) Field of Search .................. 123/179.5, 179.18, 123/182.1, 21, 481, 198 F, 179.1

(56) References Cited

U.S. PATENT DOCUMENTS

| | | | | |
|---|---|---|---|---|
| 4,945,870 A | * | 8/1990 | Richeson | 123/21 |
| 5,117,790 A | * | 6/1992 | Clarke et al. | 123/198 F |
| 5,219,397 A | * | 6/1993 | Jones | 123/182.1 |
| 5,930,992 A | * | 8/1999 | Esch et al. | 123/481 |

\* cited by examiner

*Primary Examiner*—Andrew M. Dolinar
(74) *Attorney, Agent, or Firm*—Venable; Gabor J. Kelemen

(57) ABSTRACT

A method of cold starting an internal-combustion engine includes the steps of rotating the engine crankshaft by a starter motor to initiate cold starting; and during initial work cycles of the cold start, controlling, by an engine control device, the cylinder valves, the fuel injection device and the ignition device belonging to at least one selected cylinder, such as to operate the selected cylinder in a delayed intake opening mode.

4 Claims, 1 Drawing Sheet

METHOD OF COLD STARTING A THROTTLE-FREE, MULTI-CYLINDER INTERNAL-COMBUSTION ENGINE

CROSS REFERENCE TO RELATED APPLICATION

This application claims the priority of German Application No. 198 30 974.0 filed Jul. 10, 1998, which is incorporated herein by reference.

BACKGROUND OF THE INVENTION

In the cold starting of an internal-combustion engine driven according to an Otto-process, during the first, approximately 40-second phase, significantly increased quantities of hydrocarbons are discharged into the atmosphere. The reason therefor resides mainly in the fact that the catalyst forming part of the gas exhaust system has not yet reached its operating temperature, and thus the catalytic conversion of the pollutants in the exhaust gas, particularly hydrocarbons, nitrogen oxides and carbon monoxide is performed only insufficiently. Such an increased hydrocarbon emission is reduced only in the course of the successive operation, in response to the increase of the operating temperature of the catalyst.

SUMMARY OF THE INVENTION

It is an object of the invention to provide an improved method of cold starting which reduces the pollutant emissions immediately upon cold starting of the internalcombustion engine.

This object and others to become apparent as the specification progresses, are accomplished by the invention, according to which, briefly stated, the method of cold starting an internal-combustion engine includes the steps of rotating the engine crankshaft by a starter motor to initiate cold starting; and during initial work cycles of the cold start, controlling, by an engine control device, the cylinder valves, the fuel injection device and the ignition device belonging to at least one selected cylinder, such as to operate the selected cylinder with a "delayed intake opening" mode.

Expediently, during the subsequent work cycles the cylinder valves may be controlled in the "early intake opening" mode.

"Delayed" or "early" intake opening modemeans that an intake valve of an engine cylinder is opened by the engine control later or earlier than themoment the piston reaches its upper dead center upon completion of the exhaust stroke. Operating an engine in such "delayed" or "early" intake opening mode is conventional by itself and is explained in detail, for example, in U.S. Pat. Nos. 4,700,684 and 5,211,146.

BRIEF DESCRIPTION OF THE DRAWING

The sole FIGURE is a symbolic representation of an internal-combustion engine and engine control adapted to perform the method according to the invention.

DESCRIPTION OF THE PREFERRED EMBODIMENTS

Figure 1:
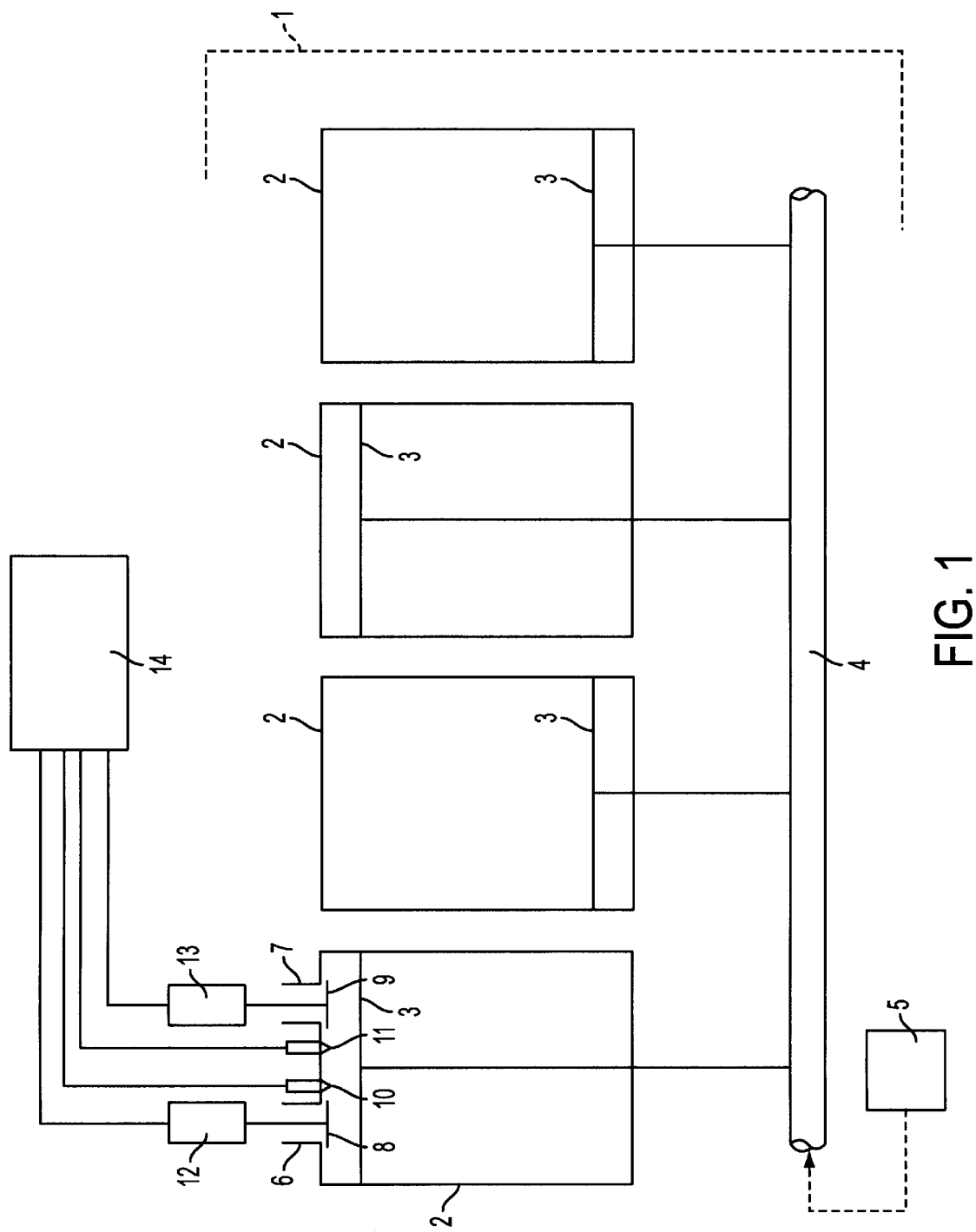

The sole FIGURE symbolically shows an internal-combustion engine 1 having four engine cylinders 2. Each cylinder 2 accommodates a reciprocating piston 3 torque-transmittingly connected to an engine crankshaft 4 which, for starting the engine, is cranked by a starter motor 5.

Each cylinder 2 has an intake port 6 and an exhaust port 7, opened and closed by a respective cylinder valve 8 and 9. Each cylinder 2 is furthermore provided with a fuel injection device 10 an ignition device 11. The engine valves 8 and 9 are operated by respective electromagnetic actuators 12 and 13.

It is noted that, for the sake of clarity, the components 6–13 are shown only for the leftmost engine cylinder 2; it will be understood that all engine cylinders include such components.

An engine control device 14 is connected to the fuel injection device 10, the ignition device 11 and the electromagnetic actuators 12 and 13 of all the cylinders 2 for performing, for all the cylinders, a fully variable timing of the operation of the valves, the injection and the ignition.

It is noted that for the sake of clarity the engine control device 14 is shown connected only to the components of the leftmost cylinder; it will be understood that such a connection is present for the similar components of all the other engine cylinders 2.

The cold starting method according to the invention advantageously utilizes the fact that in electromagnetic valve drives of the "swinging" type, when the electromagnets are in a de-energized state, the cylinder valves assume a position which corresponds to one-half of the valve stroke. In such a position the valves are thus in an open state. This circumstance makes it possible to rotate the crankshaft by the starter without compression so that, on the one hand, a lubricating film may immediately build up and, on the other hand, because of the absence of the resistance to compression, a higher crankshaft rpm may be obtained than in a conventional internal-combustion engine having the same starter power. It is, however, also feasible to energize the electromagnets early, so that the engine valves start an early oscillation. Such an oscillation start may be effected so that the cylinder valves are at least partially opened and therefore the crankshaft may be rotated without or at least with a reduced compression.

As soon as the starter rotates the crankshaft, the cylinder valves, the fuel injection device and the ignition device of at least one of the cylinders are operated in a predeterminable cycle by means of the engine control. The fully variably controllable electromagnetic drives of the cylinder valves make possible to predetermine for the cold starting phase a cycle which is different from that needed later, for the normal operation. Thus, it is feasible, for example, to operate in the cold starting phase first in a two-stroke cycle and later switch over to the normal four-stroke cycle. It is also feasible to "activate" in the starting phase initially less than all the cylinders but rather, only one or two cylinders which, because of the increased load requirement, may be driven with an increased fuel proportion so that the temperature level of the exhaust gases exiting the individual cylinders is increased much more rapidly. By an alternating drive, that is, by alternating the operating (active) cylinders, the internal-combustion engine may be heated in an overall uniform manner.

By means of the cold starting strategy described above, the heating phase is shortened because the level of the exhaust gas temperature increases more rapidly. As a result, the after-connected exhaust gas catalyst reaches its operating temperature faster and thus the conversion of the pollutants contained in the exhaust gas occurs earlier.

In accordance with a preferred embodiment of the method according to the invention, the exhaust valves of the active cylinders are opened by the engine control during the expansion stroke (after the piston has passed the lower dead center) only when the inner cylinder pressure equals the pressure in the exhaust port. While in case of conventional valve control periods, at the opening moment of the exhaust valve a backflow of already ejected exhaust gas quantities occurs which leads to a reduction of the inner cylinder temperature and thus to a reduction of the post-reaction in the cylinder, according to a preferred embodiment of the method according to the invention the exhaust valve is maintained closed until the inner cylinder pressure again reaches the pressure that prevails in the exhaust port. This prevents a backflow of the exhaust gas and the period for the post-reaction in the cylinder is significantly increased. The reaction energy leads to an additional increase of the exhaust gas temperatures. The moment when the exhaust valve is opened after the piston has reached the lower dead center is therefore to be optimized by means of empirically determined data previously inputted in the engine control or by means of suitable sensors such that the moment occurs when the pressure levels in the cylinder and in the exhaust gas system have been equalized. Furthermore, higher exhaust gas temperatures lead to a reduction of the mass of the exhaust gas present when the piston reaches its upper dead center and thus such higher temperatures lead to a reduction of the residual gas proportion and result in an improved quiet run in that operational phase.

In accordance with another preferred embodiment of the method according to the invention, the moment of ignition for the active cylinders is set to a "delayed" mode in the first work cycles. Such a mode which is feasible because of the improved quiet run, leads to higher exhaust gas temperatures.

Expediently, a control table and/or characteristic operating fields are inputted in the engine control to thus predetermine the "cold starting strategy", according to which the first work cycles are controlled. The switchover between the different cycling processes during the starting phase, for example, the switchover between two-stroke, fourstroke, eight-stroke and even twelve-stroke operating modes may also be affected by means of a thermodynamically optimized characteristic field of the engine control.

The above-described cold starting process is, it will be understood, not limited to the use of electromagnetic valve drives; rather, it may find application is all systems which permit a free choice for the valve opening and closing times. Such systems thus include, for example, hydraulic valve drives.

It will be understood that the above description of the present invention is susceptible to various modifications, changes and adaptations, and the same are intended to be comprehended within the meaning and range of equivalents of the appended claims.

What is claimed is:

1. A method of cold starting an internal-combustion engine having a crankshaft, a starter motor for rotating the crankshaft, a plurality of cylinders each having fully variably operable cylinder valves controlling intake and exhaust ports and a reciprocating piston connected to the crankshaft, a fuel injection device and an ignition device coupled to each cylinder; and an engine control device for controlling the cylinder valves, the fuel injection device and the ignition device individually for each cylinder; comprising the steps of (a) rotating the crankshaft by the starter motor to initiate cold starting;

(b) during initial work cycles of the cold start, controlling, by the engine control device, the cylinder valves, the fuel injection device and the ignition device belonging to at least one selected cylinder, such as to operate said one selected cylinder in a delayed intake opening mode; and (c) opening the cylinder valves controlling the exhaust ports of respective operating cylinders during an expansion stroke, after the piston has passed the lower dead center, only at a time when the pressure within the cylinder equals the pressure in the respective exhaust port.

2. The method as defined in claim 1, further comprising the step of controlling, subsequent to the initial work cycles, the cylinder valves to operate in an early intake opening mode.

3. The method as defined in claim 1, further comprising the step of switching the respective operative cylinders by the engine control device to different stroke modes.

4. The method as defined in claim 1, further comprising the steps of (a) controlling the cylinders such that at any time simultaneously less than all cylinders are operative; and (b) controlling the cylinders such that all cylinders are cyclically alternatingly rendered operative.

* * * * *